Figure 1:
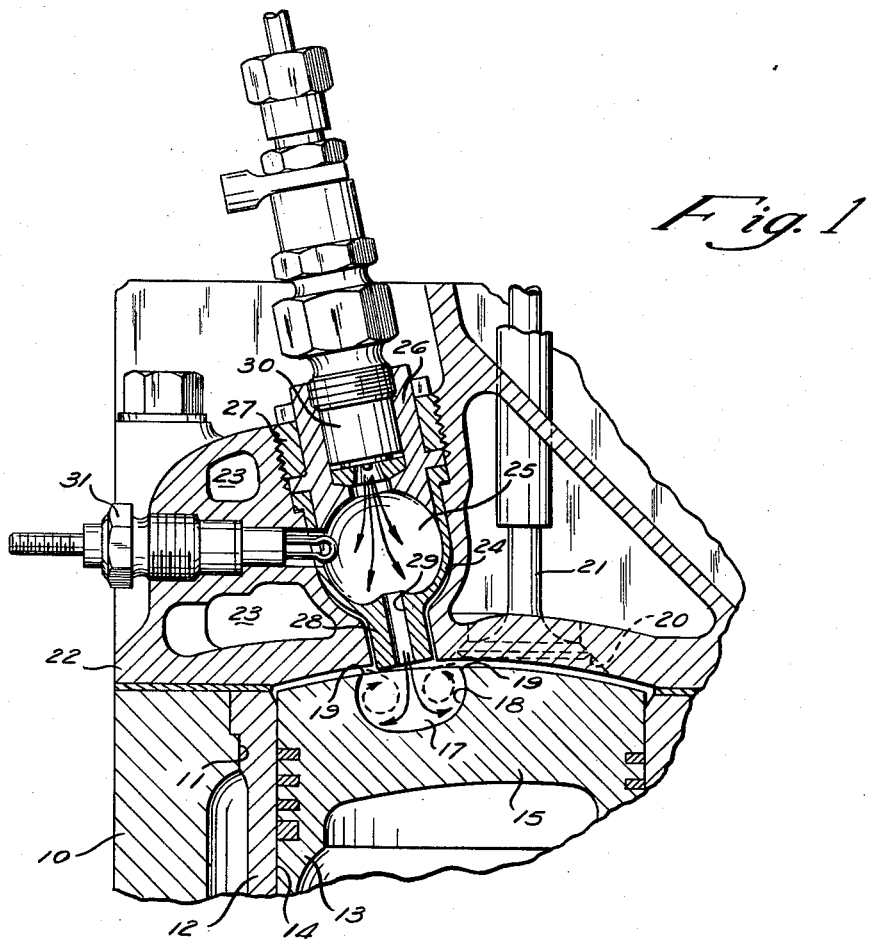

April 12, 1960

J. E. WITZKY 2,932,289

PRECOMBUSTION CHAMBER

Filed Oct. 20, 1958

INVENTOR.
JULIUS E. WITZKY
BY
WATTS & EDGERTON
A.H. Edgerton
ATTORNEYS

United States Patent Office 2,932,289
Patented Apr. 12, 1960

2,932,289

PRECOMBUSTION CHAMBER

Julius E. Witzky, Cleveland Heights, Ohio

Application October 20, 1958, Serial No. 768,095

7 Claims. (Cl. 123—32)

This invention relates broadly to diesel engines, and more specifically to engines of the type that embody a precombustion chamber in the cylinder head and a combustion chamber in the top of the piston.

The invention further contemplates certain structural improvements in the configuration of the combustion chamber, the proportions of an outlet from the precombustion chamber to the main combustion chamber, the form of the combustion and precombustion chambers, and the ratio of the volumetric capacity of the two chambers. The precombustion chamber is spheroidal, and the combustion chamber is ellipsoidal with the major axis thereof normal to the medial axis of the precombustion chamber outlet. When the piston approaches top dead center position in the compression stroke, the air admitted through the intake valve and displaced from the cylinder will be forced into the main combustion chamber in a divided swirling movement, and when combustion in the precombustion chamber is initiated, a fuel-flame mixture with high velocity will be forced through the throat of the chamber into the swirling air of the main combustion chamber.

The capacity of the precombustion chamber is approximately twenty-eight (28) to thirty-two (32) percent of the compression volume, and the capacity of the combustion chamber is forty (40) to forty-five (45) percent of the compression volume.

The primary object of the invention is to provide a combustion chamber with a sharp edge or rim around the opening thereto and curved side and end walls so the fuel mixture will follow the contour thereof at a high rate of velocity, and thus effect a controlled swirling movement of the fuel charge in each end of the ellipsoidal cavity. Such movement of the air will effectuate a thorough and complete admixture of the fuel therewith and the consequent high utilization of air at a high mean effective pressure.

A further object of the invention is to provide a passageway or throat between the combustion chamber and precombustion conduit of liberal proportions in order to reduce the pumping losses and lower the fuel consumption.

Another object of the invention is to provide a passageway or throat in the combustion chamber of sufficient size to facilitate the ready admission of air without appreciable thermal loss so the fuel injected therein may be readily ignited during initial combustion and starting difficulties eliminated.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a vertical sectional view of the upper portion of an engine assembly embodying the invention.

Referring to Fig. 1, the engine comprises a cylinder block 10 having a bore 11 therein for a cylinder liner 12. A piston 13 is mounted in a conventional manner in the bore 14 of the liner, the head 15 of the piston being formed with a recess therein defining an ellipsoidal combustion chamber 17. The throat 18 of the combustion chamber is eccentric the medial axis of the piston, and the inner edges 19 thereof overhang the cavity that defines the ellipsoidal chamber in order to effect a swirling motion of the air (indicated in the combustion chamber 17 by dotted lines) delivered through a valve port 20 which is controlled by an air inlet valve 21.

The top of the cylinder is provided with a cylinder head 22, which like the cylinder block, is formed with a water-jacket 23 for the circulation of a coolant. The cylinder head has a hollow insert 24 therein constituting a precombustion chamber 25 which is retained in the head by a sleeve 26 having a hemispherical end portion that completes the spheroidal precombustion chamber 25. The sleeve 26 is held in place by a collar 27 threaded into the cylinder head. The insert 24 may be made from a material of low thermal heat conductivity, but of high heat resistance. The walls of the insert 24 define the spheroidal precombustion chamber 25, and the lower end thereof has a tubular conduit 28 protruding therefrom which terminates adjacent the lower face of the cylinder head. The tubular conduit 28 defines an outlet canal 29 for the discharge of the ignited fuel and the unburnt products of combustion. The opposed end of the precombustion chamber 25 is retained by the sleeve 26, the bore therein being drilled and tapped for the reception of a fuel injection nozzle 30 communicating with the chamber 25. The cylinder head and the insert 24 may, if desired, be cross-drilled for the reception of a glow plug 31 having the incandescent end thereof in the chamber 25.

In a water cooled engine, the intake and exhaust valves are inclined relative to the medial axis of the cylinder to facilitate the disposition of the precombustion chamber and injector relatively close to the vertical center line of the cylinder. In addition, the inclined valve arrangement affords the advantage of a cylinder head with a dome-shaped contour which increases the stiffness and rigidity of the structure.

The opening in the conduit 28 and the throat 18 of the combustion chamber are disposed in aligned relation. Hence, when the flame and unburnt products of combustion from the precombustion chamber enter the main combustion chamber, a thorough mixture of air and the unburnt particles of fuel will produce a highly combustible gas due to the controlled swirling movement of the air in the main combustion chamber.

An engine of the present invention may be readily started since some of the fuel injected into the main combustion chamber 17 during the starting period will penetrate the circulating air in the main combustion chamber where the temperature of the compressed air is high enough to initiate ready ignition.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A diesel engine comprising a cylinder block having a cylinder therein, a piston in said cylinder having an ellipsoidal combustion chamber in the head thereof, a cylinder head on said block having a recess therein, a precombustion chamber insert in said recess, said insert comprising a spheroidal bowl, a flange on the top thereof, a sleeve engaged with said flange, a threaded collar in the cylinder block engaged with said sleeve for the retention thereof, a fuel nozzle threaded in the top of said sleeve communicating with said spheroidal precombustion chamber, a diametrically restricted ledge circumambient the top of said combustion chamber to effect a swirling movement of air in said combustion chamber, the flame and fuel from said precombustion chamber penetrating the swirling air in said combustion chamber when the piston reaches the top of its compression stroke.

2. A diesel engine comprising a cylinder block having a cylinder therein, a piston in said cylinder having an ellipsoidal combustion chamber in the head thereof, a cylinder head on said block having a recess therein, a precombustion chamber insert in said recess, said insert comprising a spheroidal bowl, a flange on the top thereof, a sleeve engaged with said flange, a threaded collar in the cylinder block engaged with said sleeve for the retention thereof, a fuel nozzle threaded in the top of said sleeve communicating with said spheroidal precombustion chamber, a glow plug in said precombustion chamber, a diametrically restricted ledge circumambient the top of said combustion chamber to effect a swirling movement of air in said combustion chamber, the flame and fuel from said precombustion chamber penetrating the swirling air in said combustion chamber when the piston reaches the top of its compression stroke.

3. An internal combustion engine comprising a cylinder block, a cylinder therein, a piston in said cylinder having an ellipsoidal combustion chamber in the head thereof, a cylinder head on said block having a spheroidal precombustion chamber therein, a tubular conduit in said head having an outlet canal therein communicating with the center of said combustion chamber in said piston, a fuel nozzle in said head communicating with said precombustion chamber, said piston having an opening in the head thereof for the entry of the end portion of said conduit, said opening being approximately five times the diameter of said outlet canal in said conduit, a ledge circumambient said opening, the wall of said combustion chamber subjacent said ledge undercut to define a sharp edge with the walls thereof curved to deflect the air in said chamber over the walls of said combustion chamber and effect swirling movement of the air in said combustion chamber, the fuel from precombustion chamber penetrating the swirling air in said combustion chamber and delivering it when the fuel is injected therein.

4. An internal combustion engine comprising a cylinder block having passageways therein for the circulation of a coolant, a cylinder in said block, a piston in said cylinder having an ellipsoidal cavity in the head thereof constituting a combustion chamber, a cylinder head on said block having passageways therein for the circulation of a coolant, said cylinder head having a spheroidal cavity therein constituting a precombustion chamber, a tubular outlet conduit in the center of said cylinder head normal to the horizontal axis, a fuel injection nozzle in said precombustion chamber, a ledge overhanging said combustion chamber and having a sharp edge and an opening therein, the dimension of the maximum diameter thereof being greater than the opening in the combustion chamber, whereby fuel from the precombustion chamber penetrates the vertical axis of the swirling air in said combustion chamber when injected therein.

5. An internal combustion engine comprising a cylinder block, a cylinder therein, a piston in said cylinder having an ellipsoidal combustion chamber in the head thereof, a cylinder head on said block having a spheroidal precombustion chamber therein, a tubular outlet conduit in the center of said precombustion chamber communicating with the center of said combustion chamber, a fuel nozzle in said head communicating with said precombustion chamber, a ledge circumambient the top of said combustion chamber, the wall of said combustion chamber being curved outwardly and of dimensions greater than the maximum dimension of said ledge so the air in said combustion chamber will be directed in a swirling path, whereby unburnt fuel from said precombustion chamber will flow into the center of said combustion chamber and divide it into two swirling paths.

6. A diesel engine comprising a cylinder block having a cylinder therein, a piston in said cylinder having an ellipsoidal cavity in the head thereof constituting a combustion chamber, a cylinder head on said block having a spheroidal cavity therein constituting a precombustion chamber, a conduit in the center of said precombustion chamber aligned with the vertical axis of said combustion chamber, a fuel injection nozzle in said precombustion chamber, a ledge circumambient the throat of said combustion chamber, the wall of said combustion chamber being arcuate, whereby the flame and unburnt fuel from said precombustion chamber will divide the air in the combustion chamber and produce a right and a left hand swirling mixture.

7. A diesel engine comprising a cylinder block, a cylinder therein, a piston in said cylinder having an ellipsoidal combustion chamber in the head thereof having an opening in the center thereof, a cylinder head on said block having a spheroidal precombustion chamber therein, a tubular conduit from said precombustion chamber protruding through the opening in said combustion chamber, a fuel nozzle in said precombustion chamber, a sharp ledge surrounding the opening in said combustion chamber, said ledge being smaller than the maximum diameter of said combustion chamber, whereby unburnt fuel from said precombustion chamber will enter the center of said combustion chamber and penetrate the air therein at the top dead center of stroke of said piston.

References Cited in the file of this patent

FOREIGN PATENTS

| | | |
|---|---|---|
| 717,215 | Great Britain | Oct. 20, 1954 |
| 321,654 | Switzerland | May 15, 1957 |